United States Patent Office 3,651,046
Patented Mar. 21, 1972

3,651,046
QUINAZOLINO-BENZODIAZEPINES AND METHODS FOR THE PREPARATION THEREOF
Michael Edward Derieg, West Orange, Rodney Ian Fryer, North Caldwell, and Leo Henryk Sternbach, Upper Montclair, N.J., assignors to Hoffmann-La Roche Inc., Nutley, N.J.
No Drawing. Filed Jan. 30, 1969, Ser. No. 795,345
Int. Cl. C07d 53/06
U.S. Cl. 260—239.3
25 Claims

ABSTRACT OF THE DISCLOSURE

A new class of pharmaceutically active tetracyclic compounds is described. The subject compounds are derivatives of benzodiazepines. The tetracyclic compounds are useful as sedatives, muscle relaxants and anti-convulsant agents.

BRIEF SUMMARY OF THE INVENTION

The present invention relates to tetracyclic compounds of the following formula

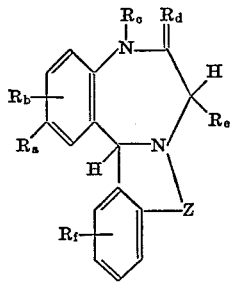

I wherein Z is selected from the group consisting of

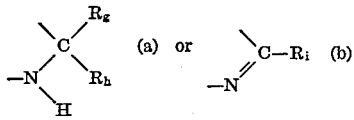

$R_a$ and $R_b$ each independently are selected from the group consisting of hydrogen, halogen, nitro, trifluoromethyl, lower alkyl, lower alkylmercapto, or lower alkoxy; $R_c$ is hydrogen, lower alkyl, cyclo-lower alkyl, amino lower alkyl, monoalkylamino-lower alkyl, dialkylamino-lower alkyl, carboxy-lower alkyl or hydroxy lower alkyl; $R_d$ is selected from the group consisting of

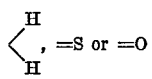

$R_e$ is hydrogen, lower alkyl, hydroxy, lower alkoxy, lower alkoxy-lower alkyl and lower alkyl mercapto-lower alkyl; $R_f$ is hydrogen, lower alkyl, halogen, nitro or trifluoromethyl; $R_g$, $R_h$ and $R_i$ each independently are hydrogen, lower alkyl, phenyl or substituted phenyl and $R_g$ and $R_h$ taken together with the co-bonded carbon atom is a cycloalkyl group having 3 to 6 carbon atoms or a carbonyl group and the acid addition salts thereof.

As used herein, the term "lower alkyl" comprehends straight or branched chain hydrocarbon groups having 1–7 carbon atoms, preferably 1–4 carbon atoms, such as methyl, ethyl, propyl, isopropyl, or the like. Cyclo-lower alkyl encompasses hydrocarbon groups having 3–6 carbon atoms, such as cyclopropyl, cyclobutyl, cyclopentyl, etc. The term "acyl" includes groups such as acetyl, propionyl, etc. The term "lower alkoxy" comprehends a lower alkyl group having an —O— functionality substituted therein such as methoxy, ethoxy, propoxy, etc. The term "substituted phenyl" encompasses a phenyl group substituted with at least one member selected from the group consisting of halogen, nitro, lower alkyl, trifluoromethyl, alkoxy, lower alkylmercapto and lower alkylamino. Halogen represents all four halogens, i.e., fluorine, iodine, chlorine and bromine with chlorine and bromine the halogens of preference.

In one preferred aspect of the present invention, compounds of Formula I are defined wherein $R_d$ is =O and Z is group (a), i.e., compounds of the formula

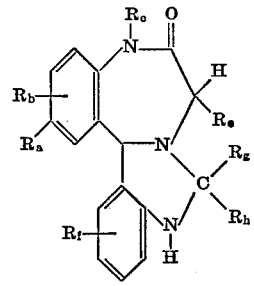

II where $R_a$, $R_b$, $R_c$, $R_d$, $R_e$, $R_f$, $R_g$ and $R_h$ are as above and the acid addition salts thereof.

Preferred embodiments of compounds of Formula II above are obtained when $R_a$ is halogen, most preferably chlorine or bromine; $R_b$ is hydrogen; $R_c$ is lower alkyl, most preferably methyl; $R_e$ is hydrogen; $R_f$ is hydrogen; $R_g$ and $R_h$ each taken independently are hydrogen, lower alkyl (most preferably methyl) and phenyl; and $R_g$ and $R_h$ taken together with the co-bonded carbon atom is a carbonyl group. In one especially preferred embodiment $R_g$ and $R_h$ when both are taken independently are both lower alkyl, most preferably both are methyl. Examples of especially preferred embodiments of this aspect of the present invention include the following compounds:

2-bromo-7,14b-dihydro-5-methyl-quinozolino[3,4-d][1,4]benzodiazepine-6,9(5H,10H)-dione
2-bromo-7,9,10,14b-tetrahydro-5,9,9-trimethyl-quinazolino[3,4-d][1,4]benzodiazepin-6-(5H)-one
2-chloro-7,9,10,14b-tetrahydro-5-methyl-9-phenyl-quinazolino[3,4-d][1,4]benzodiazepin-6-(5H)-one
2-chloro-7,9,10,14b-tetrahydro-5,9,9-trimethyl-quinazolino[3,4-d][1,4]benzodiazepin-6-(5H)-one
2-chloro-7,9,10,14b-tetrahydro-5-methylquinazolino[3,4-d][1,4]benzodiazepin-6-(5H)-one
2-chloro-7,14b-dihydro-5-methylquinazolino[3,4-d][1,4]benzodiazepine-6,9-(5H,10H)-dione In another preferred aspect of the present invention compounds of Formula I are defined wherein $R_d$ is =O and Z is group (b), i.e., compounds of the general formula

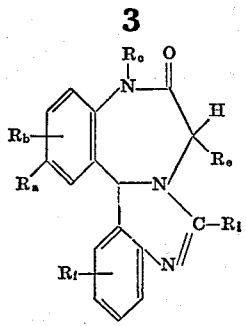

III where $R_a$, $R_b$, $R_c$, $R_e$, $R_f$ and $R_i$ are as above and the acid addition salts thereof.

Preferred embodiments of this aspect of the present invention are obtained when $R_a$ is halogen, most preferably chlorine; $R_b$ is hydrogen; $R_c$ is lower alkyl, most preferably methyl; $R_e$ is hydrogen, $R_f$ is hydrogen and $R_i$ is lower alkyl, most preferably methyl. An example of a preferred embodiment of this aspect of the invention is the following compound:

2-chloro-7,14b-dihydro-5,9-dimethylquinazolino[3,4-d][1,4]benzodiazepin-6(5H)-one and acid addition salts thereof.

In a third aspect of the present invention, compounds of Formula I are defined wherein $R_d$ is

and Z is group (a), e.g., compounds of the following formula

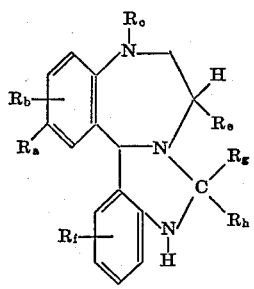

IV where $R_a$, $R_b$, $R_c$, $R_e$, $R_f$, $R_g$ and $R_h$ are as above and the acid addition salts thereof.

Preferred embodiments of the above aspect of the present invention are obtained when $R_a$ is halogen, most preferably chlorine; $R_b$ is hydrogen; $R_c$ is lower alkyl, most preferably methyl; $R_e$ is hydrogen; $R_f$ is hydrogen and $R_g$ and $R_h$ when taken together with the co-bonded carbon atom is a carbonyl group. An example of a representative compound for this preferred embodiment is 2-chloro-5,6,7,14b - tetrahydro - 5 - methylquinazolino - [3,4-d][1,4]benzodiazepin-9(10H)-one.

A fourth aspect of the compounds of Formula I above is obtained when

and Z is group (b); e.g., compounds of the following formula

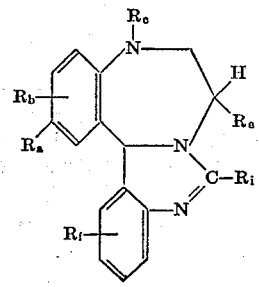

V where $R_a$, $R_b$, $R_c$, $R_e$, $R_f$ and $R_i$ are as above and the acid addition salts thereof.

Preferred embodiments of this aspect of the present invention are obtained when $R_a$ is halogen, most preferably chlorine; $R_b$ is hydrogen; $R_c$ is lower alkyl, most preferably methyl; $R_e$ is hydrogen, $R_f$ is hydrogen; and $R_i$ is hydrogen. A compound which exemplifies the preferred embodiment of this aspect is 2-chloro-5,6,7,14b-tetrahydro-5-methylquinazolino[3,4-d][1,4]benzodiazepine.

The compounds of Formula I having one assymetric center can exist as racemates or as optical enantiomers which may be obtained by employing conventional resolution procedures on the racemate. Those compounds of Formula I having two assymetric centers can exist as diastereomers which may be separated by known techniques. These diastereomers may then be resolved into their optical enantiomers as above. The scope of the present invention includes the racemates, diastereomers and optical enantiomers of the compounds of Formula I.

Certain of the compounds I through V above, as indicated, may be obtained in the form of the acid addition salt. In a most preferred embodiment such salts are formed with pharmaceutically acceptable acid groups. Examples of such pharmaceutically acceptable acid groups include the inorganic and organic acid salts, such as hydrochloric acid, hydrobromic acid, nitric acid, sulfuric acid, acetic acid, formic acid, succinic acid, maleic acid, p-toluenesulfonic acid and the like. These salts may be prepared from the free base forms of compounds I through V by methods well known in the art. Additionally, the non-pharmaceutically acceptable acid salts of the aforementioned compounds are useful as intermediates in the preparation of pharmaceutically acceptable acid addition salts of such compounds by salt exchange techniques or by converting said non-acceptable salt to the free base followed by reformation of the salt utilizing a pharmaceutically acceptable acid. Both such techniques utilize methods well known in the art.

In one process aspect of the present invention, compounds of Formula II or Formula IV where $R_g$ and $R_h$ are other than carbonyl when taken together with the co-bonded carbon atom, are prepared by reacting a compound of the formula:

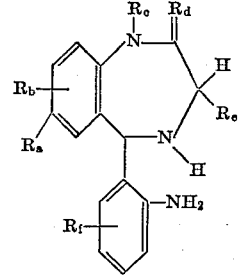

VI where $R_a$, $R_b$, $R_c$, $R_d$, $R_e$, and $R_f$ are as above with an aldehyde or ketone of the following formula

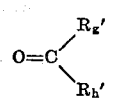

VII where $R_g'$ and $R_h'$ each independently are hydrogen, lower alkyl, phenyl or substituted phenyl and $R_g'$ and $R_h'$ taken together with the co-bonded carbon atom is a cycloalkyl group having 3 to 6 carbon atoms.

The reaction between compounds of Formula VI and Formula VII above can conveniently be conducted either in an excess of the compounds of Formula VII as the solvent medium or alternatively in the presence of an inert organic solvent, such as, for example, a lower alkanol, e.g., methanol, ethanol, etc.; an aliphatic or aromatic hydrocarbon, e.g., Tetralin, cyclohexane, benzene, xylene, toluene, etc.; dimethylformamide, acetonitrile, dimethylsulfoxide; and ethers, e.g., dibutyl ether, tetrahydrofuran, among others.

The reaction conditions associated with this reaction include a temperature between about 0° C. to the reflux temperature of the reaction medium. A preferred temperature range includes room temperature to the reflux temperature of the reaction medium. The subject reaction is facilitated by conducting it in the presence of an acidic catalyst. This acidic catalyst can be organic or inorganic. Examples of suitable inorganic acid catalysts include the mineral acids, e.g., hydrochloric acid. The organic acids useful in conducting the subject reaction include acetic acid, trifluoroacetic acid, p-toluene sulfonic acid among others.

The compound of Formula II or Formula IV where $R_g$ and $R_h$ taken together with the co-bonded carbon atom is a carbonyl group are conveniently prepared by reacting a compound of Formula VI above with a carbonylating agent, e.g., carbonyl-diimidazole, phosgene, etc. The reaction is conveniently carried out at a temperature in the range of from about 0° C. to the reflux temperature of the reaction medium, most preferably at about room temperature. Suitable inert organic solvents for use in this reaction include, for example, diethyl ether, dibutyl ether, etc.; ethers such as tetrahydrofuran, aromatic hydrocarbons such as benzene, xylene, toluene; chlorinated hydrocarbons such as chloroform, among others. The solvents of preference are tetrahydrofuran or benzene. The subject reaction is conducted under anhydrous conditions, most preferably under an inert gas atmosphere, e.g., nitrogen, argon, etc.

In a further process aspect of the present invention compounds of the Formula III or V are prepared by the dehydrative cyclization of compounds of the following formula:

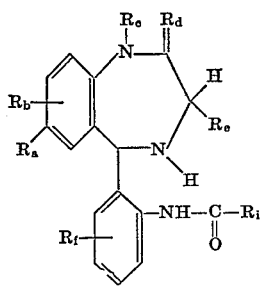

VIII where $R_a$, $R_b$, $R_c$, $R_d$, $R_e$, $R_f$ and $R_i$ are as above.

In a preferred embodiment of the above process aspect, compounds of Formula III or Formula V may be prepared by mild reduction of a compound of the following formula:

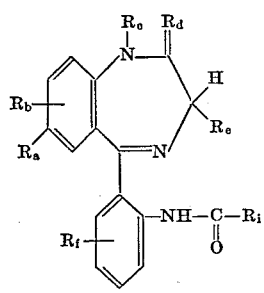

IX where $R_a$, $R_b$, $R_c$, $R_d$, $R_e$, $R_f$ and $R_i$ are as above.

The above reduction is conducted in the presence of a metal reduction catalyst such as platinum, palladium, etc. Additionally, it is possible to utilize chemical reducing agents such as $NaBH_4$ or an alkyl amino. The reaction conditions employed include a temperature in the range of from about 0 to 50° C., most preferably at room temperature and for catalytic reduction a pressure in the range of from about 1 atm. to 5 atm., most preferably at atmospheric pressure. The aforesaid reaction may be conducted in the presence of added inert organic solvents such as for example a lower alkanol, e.g., methanol, ethanol or an organic acid, e.g., acetic acid. Under the reaction conditions employed the proposed intermediate in this hydrogenation reaction, i.e., a compound of Formula VIII may undergo spontaneous cyclization to desired compounds of Formula IX above.

In another process modification of the present invention compounds of Formula III or Formula V above where $R_i$ is hydrogen may be prepared directly from compounds of Formula VI. Such process involves the reaction of the Formula VI compound with an excess of triethylorthoformate at a temperature in the range of from about 25° C. to the reflux temperature of the reaction medium, most preferably in the range of from about 75 to 100° C.

Compounds of Formula I wherein $R_d$ is =S are readily prepared from correspondingly substituted compounds of Formula I where $R_d$ is =O by treating the latter compounds with phosphorus pentasulfide in a manner well known in the art. In the embodiment wherein Z contains a carbonyl group, it is preferred that the starting material (e.g., compound VI) be treated with phosphorus pentasulfide prior to formation of the fourth ring.

Compounds of Formula I wherein $R_c$ is hydrogen may be converted into any of the other $R_c$ definition compounds by treating the former compounds, preferably in a metallo salt form at the 1-position, e.g., the sodium salt, with a halo or sulfate derivative of the desired substituent to be introduced. Thus, for example, a Formula I compound having $R_c$ as hydrogen is converted into a corresponding 1-alkylated compound by treating a 1-sodio salt of the former compound with methyl iodide, dimethyl sulfate, amino-alkyl halides, or a functional derivative of carboxyalkyl halides.

It is further within the skill of the art to effect transformations in the identity of substituents on the aromatic rings of compounds of Formula I. Thus, a nitro group can be reduced to an amino group which in turn can be mono- or di-alkylated. The amino group can also be converted into a variety of substituents, e.g., halogens by means of reactions known in the art, e.g., the Sandmeyer reaction. Halogen substituents can be substituted with an alkylmercapto or alkoxy group by methods known in the art. Additionally, the amino group may be oxidized to a nitro group in a manner known per se.

Compounds of Formula I wherein $R_d$ is =O or

may be interconverted by reduction or oxidation procedures well established in the benzodiazepine art.

The preparation of representative starting materials, if not otherwise known to the art, may be accomplished in a manner indicated in the reaction scheme below. The preparation of other correspondingly substituted starting materials will thus be made obvious to a chemist knowledgeable in synthetic methods.

REACTION SCHEME
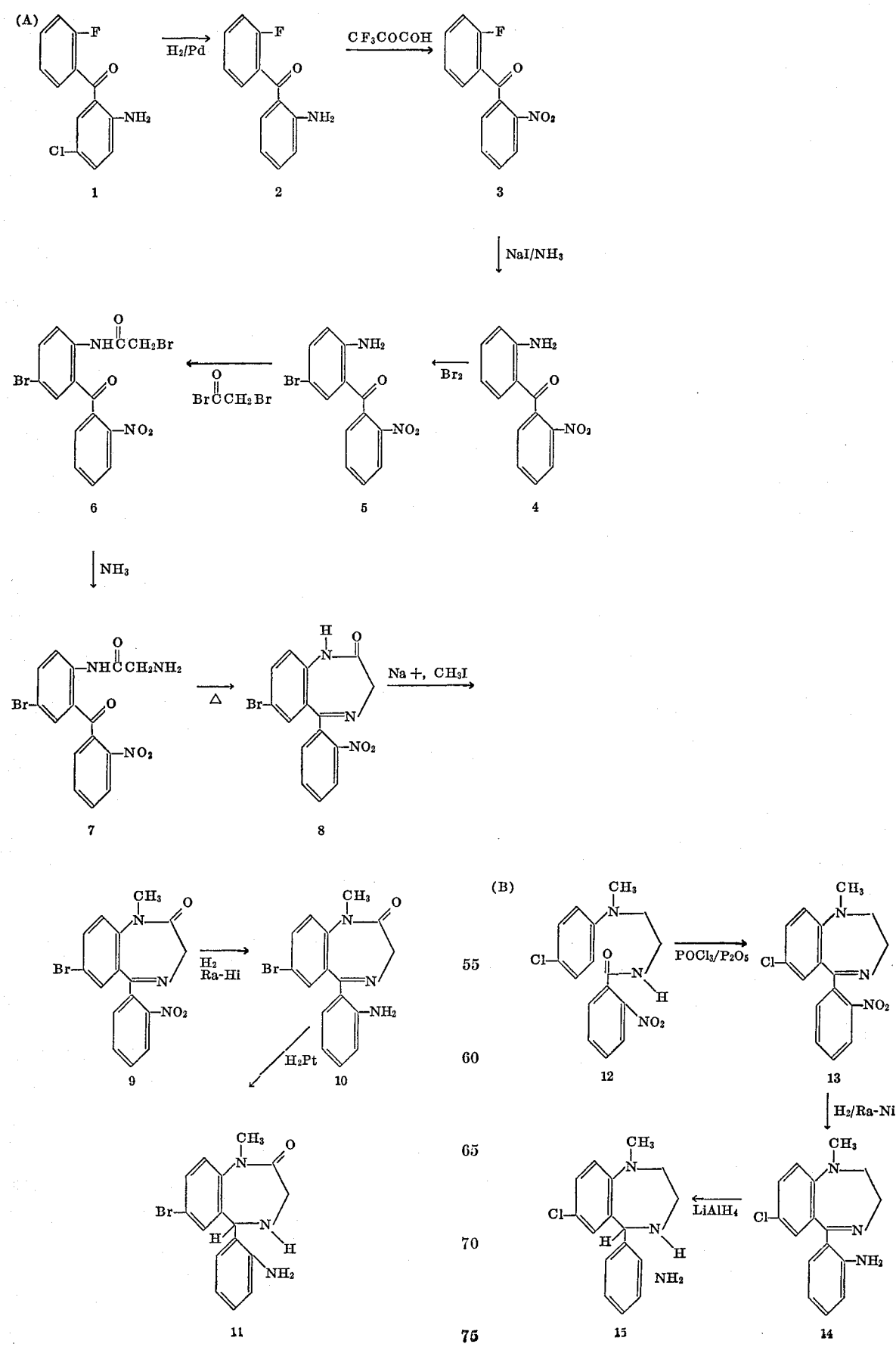

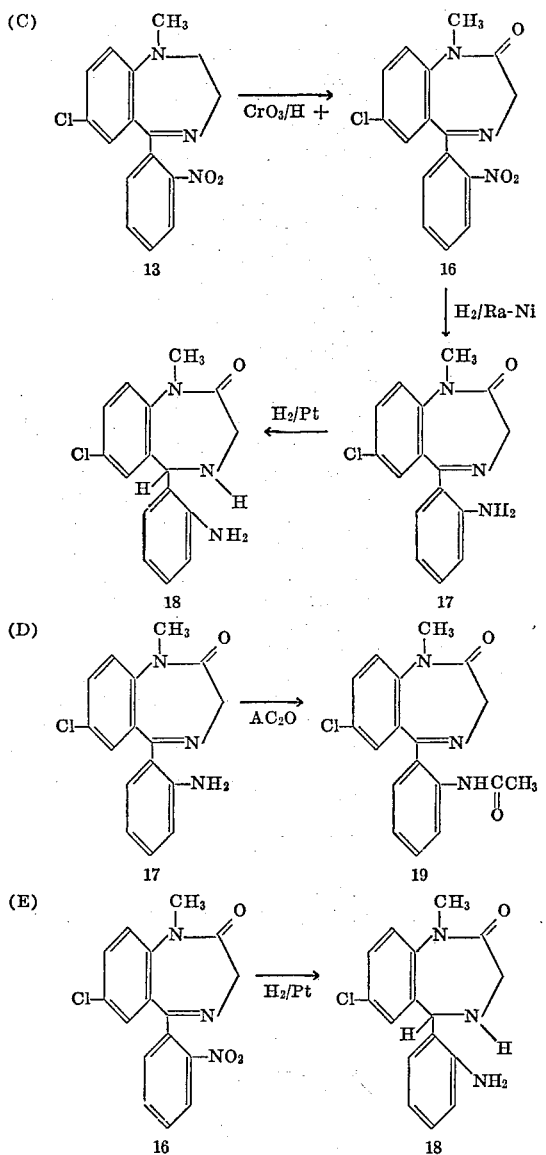

It is clear from the above reaction scheme that compounds of Formulas VI and VIII are readily available as end products from Reaction Scheme A, B, C, D, and E. Variations in the identity and location of substituents could fall within obvious extensions of the reactions outlined in this reaction scheme.

The compounds of the present invention and their pharmaceutically acceptable salts are useful as pharmaceuticals and are characterized in having activity as anticonvulsant agents, sedatives and muscle relaxants. These compounds can be used in the form of conventional pharmaceutical preparations; for example, the aforesaid compounds can be mixed with conventional organic or inorganic inert pharmaceutical carriers suitable for parenteral or enteral administration such as, for example, water, gelatin, lactose, starch, magnesium stearate, talc, vegetable oil, gums, polyalkylene glycols, petroleum jelly or the like. They can be administered in conventional pharmaceutical forms, e.g., solid forms, for example, tablets, dragees, capsules, suppositories or the like; or in liquid forms, for example, solutions, suspensions, or emulsions. Moreover, the pharmaceutical compositions containing compounds of this invention can be subjected to conventional pharmaceutical expedients such as sterilization, and can contain conventional pharmaceutical excipients such as preservatives, stabilizing agents, wetting agents, emulsifying agents, salts for the adjustment of osmotic pressure, or buffers. The compositions can also contain other therapeutically active material.

A suitable pharmaceutical dosage unit can contain from about 1 to 500 mg. of the aforesaid compounds of Formula I or a corresponding amount of a pharmaceutically acceptable salt thereof. Suitable oral dosage regimens in mammals comprise from about 0.1 mg./kg. per day to about 300 mg./kg. per day. Suitable parenteral dosage regimens in mammals comprise from about 0.1 mg./kg. per day to about 10 mg./kg. per day. However, for any particular subject, the specific dosage regimen should be adjusted according to individual needs and the professional judgment of the person administering or supervising the administration of the aforesaid compound. It is to be understood that the dosages set forth herein are exemplary only and they do not, to any extent, limit the scope or practice of this invention.

The following examples are illustrative but not limitative of this invention. All temperatures are in degrees Centigrade. The final products are racemic unless otherwise indicated.

EXAMPLE 1

Preparation of 2-bromo-7,14b-dihydro-5-methyl-quinazolino[3,4-d][1,4]benzodiazepine-6,9-(5H,10H)-dione

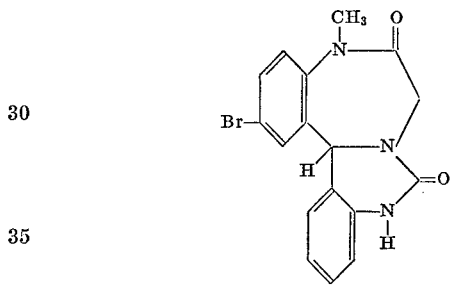

A solution of 500 mg. (1.44 mmol) of 7-bromo-1-methyl-5-(2 - aminophenyl) - 1,3,4,5 - tetrahydro-2H-1,4-benzodiazepin-2-one, 470 mg. (2.9 mmol) of carbonyldiimidazole and 20 ml. of dry tetrahydrofuran was stirred 72 hr. under an atmosphere of dry nitrogen. The reaction mixture was concentrated to a gum which was dissolved in methylene chloride, washed with 1.5 N hydrochloride and with water, dried and concentrated to yield 315 mg. (58.7%) of the above captioned product, melting point 254–256°. Recrystallizations from methylene chloride-hexane gave colorless prisms, M.P. 269–271°.

The starting material may be prepared as follows:

(A) A mixture of 250 g. (1.0 mole) of 2-amino-5-chloro-2'-fluorobenzophenone, 30 g. of charcoal, 120 g. of potassium acetate and 3 g. of palladium on carbon with 2 l. of tetrahydrofuran and 9 ml. of a 20% aqueous palladous chloride solution was shaken vigorously under an atmosphere of hydrogen at room temperature. After 7 hr., the hydrogen uptake had ceased at theory (1 mole) and the reaction vessel was flushed with nitrogen, the mixture filtered through Celite and the filtrate concentrated to a yellow crystalline residue. The crude product was dissolved in methylene chloride, the solution washed with 3 N sodium hydroxide, water and then concentrated to a residue which was recrystallized from methylene chloride in three crops totalling 164.2 g. (76.3%) of yellow crystalline 2-amino-2'-fluorobenzophenone, M.P. 125–128° C.

(B) To a stirred mixture of 1.5 l. of methylene chloride and 41.8 ml. of 90% hydrogen peroxide chilled to 0° C. with an ice bath, 262 ml. of trifluoroacetic acid anhydride was carefully added in dropwise fashion over a 2 hr. period. A solution of 79.0 g. (0.367 mole) of 2-amino-2'-fluorobenzophenone in 800 ml. of methylene chloride was added dropwise (2.5 hr.) to the above mixture. The reaction mixture was treated with a total of 1450 ml. of water and the organic layer was separated, washed with 10% sodium carbonate (3×) and water (3×). The solution was clarified by filtration through Celite, found devoid of peroxide and concentrated to a black residue. The crude product was dissolved in methylene chloride, filtered over a short column of alumina and the filtrate concentrated to give 43.4 g. (48.2%) of 2-fluoro-2'-nitrobenzophenone, M.P. 93–96°.

(C) A solution of 20 g. (82 mmole) of 2-fluoro-2'-nitrobenzophenone, 20 g. of sodium iodide, 100 ml. of liquid ammonia and 100 ml. of ethanol was shaken 6 hr. at 100–105° under 1000 p.s.i. of nitrogen in a sealed container. The reaction mixture was concentrated to a residue which was partitioned between 3 N sodium hydroxide and methylene chloride. The organic layer was separated, washed with water and concentrated to 15.4 g. of an oil. The oil was partitioned between 9 N hydrochloric acid and ether and the acid layer separated, washed with ether and neutralized with ammonium hydroxide. A yellow solid separated and was removed by filtration and recrystallized from ethanol to give 5.6 g. (28.2%) of yellow needles of 2-amino-2'-nitrobenzophenone, M.P. 147–149°.

(D) A solution of 10.2 g. (42.2 mmol) of 2-amino-2'-nitrobenzophenone and 250 ml. of acetic acid was cooled to 16° C. with an ice bath. A solution of 6.9 g. (40 mmol) of bromine in 50 ml. of acetic acid was added dropwise over 20 min. and the reaction mixture was stirred an additional five minutes. The reaction mixture was then diluted with water until a solid began to precipitate at which time the entire mixture was poured over 300 g. of ice and vigorously stirred. The solid was removed by filtration, washed with water, pulled dry and stored overnight in a vacuum desiccator yielding 14.2 g. of a yellow solid, M.P. 125–128°. By visual estimation of a TLC plate the desired 2-amino-5-bromo-2-nitrobenzophenone was present in about 95% purity.

(E) A solution of 14.2 g. (44.2 mole) of crude 2-amino-5-bromo-2'-nitrobenzophenone in 700 ml. of ether was chilled to 0° C. with an ice bath. Ice (100 g.) was added, followed by the addition of 17.7 g. (88 mmol) of bromoacetylbromide in 50 ml. of ether. The reaction mixture was stirred overnight at room temperature. The crystalline product, 2,4'-dibromo-2'(2-nitrobenzoyl)acetanilide was removed by filtration as 14.5 g. (74.0%) of colorless needles, M.P. 186–187°.

(F) A mixture of 500 ml. of liquid ammonia and 14.5 g. (32.8 mmol) of 2,4'-dibromo-2'-(2-nitrobenzoyl) acetanilide was stirred at reflux for 5 hr. The solvent was allowed to evaporate and the residue was dissolved in chloroform and extracted with 3 N hydrochloric acid. During the extraction a crystalline hydrochloride precipitated from solution and was removed by filtration. The precipitate was washed with chloroform and pulled dry to give 13.7 g. (92.8%) of the hydrochloride dihydrate of 2-amino-4'-bromo-2'-(2-nitrobenzoyl) acetanilide as pale yellow needles, M.P. 214–217°.

(G) A solution of 11.2 g. (29.6 mmol) of 2-amino-4'-bromo-2'-(2-nitrobenzoyl)-acetanilide, 400 ml. of pyridine and 50 ml. of benzene was heated at reflux into a Dean-Stark trap for 40 hr. The reaction mixture was concentrated to 10.1 g. of crude 7-bromo-5-(2-nitrophenyl)-1,3-dihydro-2H-1,4-benzodiazepin-2-one which was dissolved in benzene and filtered through a short column of alumina. The filtrate was concentrated and crystallization from benzene-hexane gave 5.7 g. (53%) of the aforesaid product. Recrystallizations from ethanol gave yellow prisms, M.P. 220–222°.

(H) A stirred solution of 5.2 g. (14.4 mmol) of 7-bromo-5-(2-nitrophenyl)1,3-dihydro-2H-1,4 - benzodiazepin-2-one, 100 ml. of dried tetrahydrofuran and 35 ml. of dried dimethylformamide under nitrogen was treated with 1.17 g. (30 mmol) of sodium amide and heated at 50° C. for 1 hr. The reaction mixture was cooled to room temperature and then treated with 2.0 ml. of methyl iodide and the reaction mixture was stirred overnight at room temperature. The crude mixture was poured over 500 g. of ice and the resultant mixture was extracted with methylene chloride. The organic layer was dried and concentrated to 7.0 g. of a solid which was recrystallized from methylene chloride-hexane to give 3.7 g. (68.6%) of yellow crystals. Recrystallizations from methylene chloride-hexane gave 7-bromo-1-methyl-5-(2-nitrophenyl)-1,3-dihydro-2H-1,4-benzodiazepin-2-one as yellow needles, M.P. 189–191°.

(I) A mixture of 2.75 g. (7.3 mmol) of 7-bromo-1-methyl - 5 - (2-nitrophenyl)-1,3-dihydro-2H-1,4-benzodiazepin-2-one, about 2 g. of Raney nickel and 300 ml. of ethanol was stirred at room temperature under an atmosphere of hydrogen. After 3 hr., the hydrogen uptake ceased at the theoretical amount and the reaction mixture was filtered through Celite and the filtrate was concentrated to 2.2 g. (87%) of 7-bromo-1-methyl-5-(2-aminophenyl) - 1,3 - dihydro-2H-1,4-benzodiazepin-2-one, M.P. 199–203°. Recrystallizations from methylene chloride-hexane gave yellow blocks, M.P. 200–205°.

(J) The starting material may be prepared as follows: A solution of 2.2 g. (6.4 mmol) of 7-bromo-1,3-dihydro-1 - methyl - 5 - (2-aminophenyl)-2H-1,4-benzodiazepin-2-one in 150 ml. of glacial acetic acid was treated with hydrogen in the presence of a platinum catalyst. The hydrogen uptake ceased at the theoretical amount and the reaction mixture was filtered through Celite. The filtrate was diluted with ice water and extracted with methylene chloride. The organic extract was washed with water (5×), diluted with benzene and concentrated in vacuo to give 1.4 g. of 7-bromo-1-methyl-5-(2-aminophenyl)-1,3,4,5-tetrahydro-2H-1,4-benzodiazepin-2-one as a yellow solid. Three recrystallizations from methylene chloride-hexane gave colorless plates, M.P. 205–208°.

EXAMPLE 2

Preparation of 2-bromo-7,9,10,14b-tetrahydro-5,9,9-trimethylquinazolino[3,4-d][1,4]benzodiazepin - 6(5H)-one

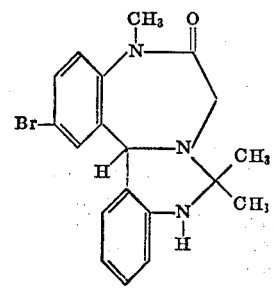

A solution of 500 mg. (1.44 mol) of 7-bromo-1-methyl-5 - (2 - aminophenyl)1,3,4,5-tetrahydro-2H-1;4-benzodiazepin-2-one in 150 ml. of dry acetone containing a catalytic amount of hydrogen chloride was heated at reflux for 18 hrs. The reaction mixture was concentrated to an orange solid. The residue was dissolved in methylene chloride and the solution washed with aqueous sodium carbonate (10%) and water. The organic layer was dried and concentrated to 500 mg. of semi-solid. Crystallization from methylene chloride-hexane gave 300 mg. (53.8%) of microprisms, M.P. 212–218°. Recrystallizations from methylene chloride-hexane gave pale yellow prisms, M.P. 222–223°.

EXAMPLE 3

Preparation of 2-chloro-7,14b-dihydro-5,9-dimethylquinazolino[3,4-d][1,4]benzodiazepin - 6(5H) - one hydrochloride hemihydrate

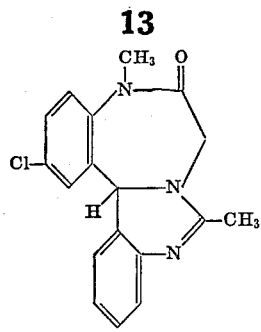

A mixture of 1.85 g. (5.4 mmol) of 5-(2-acetamidophenyl) - 7-chloro-1,3-dihydro-1-methyl-2H-1,4-benzodiazepin-2-one, about 100 mg. of platinum oxide and 250 ml. of methanol was treated with hydrogen at room temperature and atmospheric pressure. The reaction mixture was filtered to remove the catalyst and the solvent was removed leaving a yellow solid which was partitioned between 1.5 N hydrochloric acid and methylene chloride. The acid extract was treated with ammonium hydroxide and 0.9 g. of a mixture of product and starting material was removed by filtration. The crude mixture was dissolved in chloroform, put on a florisil column and eluted with hexane, ether, chloroform and ethanol. The ethanol fraction with a small amount of hydrochloric acid, was concentrated to give 350 mg. (17.5%) of 2-chloro-7,14b-dihydro-5,9-dimethylquinazolino [3,4-d][1,4]benzodiazepin-6(5H)-one hydrochloride hemihydrate as a semi-solid. The product was triturated with and recrystallized from ethyl acetate to give colorless prisms, M.P. 250–252°.

The starting material may be prepared as follows:

(A) To a stirred mixture of 200 g. (1.19 mole) of 1-methyl-1-(4-chlorophenyl)ethylenediamine and 1 l. of benzene, 221 g. (1.19 mole) of 2-nitrobenzoylchloride dissolved in 650 ml. of benzene was added with external cooling. After 1 hour, 220 ml. of pyridine was added dropwise and the reaction mixture was stirred 72 hours at room temperature. The reaction mixture was poured into 2 l. of ice water and a gummy precipitate removed by filtration. The filtrate was made acidic with 3 N HCl and extracted with benzene. The benzene solution was washed with 1.5 N sodium hydroxide and with water and was dried and concentrated to 238 g. of red oil. The addition of 50 ml. of ethyl acetate allowed crystallization of 179.5 g. (45%) of N-[2-(4-chloro-N-methylanilino)ethyl]-2-nitrobenamide as an orange solid, which was used without further purification.

(B) A mixture of 50 g. (0.15 mole) of N-[2-(4-chloro-N-methylanilino)ethyl]-2-nitrobenzamide, 700 ml. of chloroform, 600 ml. of phosphorous oxychloride and 23 g. of phosphorous pentoxide was stirred 18 hours at reflux. The reaction mixture was concentrated in vacuo to a viscous oil which was then diluted with 200 ml. of methylene chloride to give a solution which was carefully stirred into a mixture of about 6 l. of ice and 1 N ammonium hydroxide, and 800 ml. of methylene chloride. A dense precipitate formed which was removed by filtration and was washed with methylene chloride. The aqueous solution was extracted with methylene chloride and the organic fractions were combined, dried and concentrated in vacuo to a red gum. The residue was dissolved in methanol and treated with hydrogen chloride. Concentration of the solution gave a red oil which when treated with 25 ml. of acetone yielded 19.5 g. (36.9%) of 7-chloro-2,3-dihydro-1-methyl-5-(2 - nitrophenyl)-1H-1,4-benzodiazepine hydrochloride as yellow crystals, M.P. 197–208°.

(C) A mixture of 8.0 g. (25.3 mmol) of 7-chloro-2,3-dihydro-1-methyl-5-(2 - nitrophenyl)-1H-1,4-benzodiazepine hydrochloride, 500 ml. of methanol and about 7.5 g. of Raney nickel was stirred at room temperature under one atmosphere of hydrogen until the uptake ceased. The catalyst was filtered off, and the filtrate was made acidic with methanolic hydrogen chloride and concentrated to a red glass. The residue was dissolved in water, made basic with ammonium hydroxide and extracted with methylene chloride. The organic extract was washed with water, dried and concentrated to 6.0 g. (83%) of 5-(2 - aminophenyl)-7-chloro-2,3-dihydro-1-methyl-1H-1,4-benzodiazepine hydrochloride, an orange semi-solid which was used without further purification.

(D) A solution of 3.5 g. (10 mmol) of 5-(2-aminophenyl)-7-chloro-2,3-dihydro - 1 - methyl-1H-1,4-benzodiazepine hydrochloride and 50 ml. of acetic acid was chilled in an ice bath until crystallization just began; whereupon 3.4 ml. of achromic acid solution (Djerassi et al., J. Org. Chem., 21, 1547 (1956)), was added. The dark reaction mixture was stirred 1½ hours at about 15° and then ½ hour at room temperature. The reaction mixture was poured over ice and a grey solid removed by filtration. The precipitate was heated with methylene chloride and the solution was washed with water, dried and concentrated to a red gum. Trituration with ethyl acetate gave a solid which was recrystallized from methylene chloride-hexane to give 1.3 g. (39.5%) of 7-chloro-1,3-dihydro-1-methyl-5-(2 - nitrophenyl)-2H-1,4-benzodiazepin-2-one. Recrystallizations from methylene chloride-hexane gave colorless prisms, M.P. 173.5–174.5°.

(E) A mixture of 5.9 g. (18 mmol) of 7-chloro-1,3-dihydro-1-methyl-5-(2 - nitrophenyl)-2H-1,4-benzodiazepin-2-one, about 15 g. of Raney nickel and 750 ml. of ethanol was hydrogenated at room temperature and atmospheric pressure. The catalyst was removed by filtration and the solvent by evaporation to give a brown residue. Recrystallization from methylene chloride-hexane gave 3.1 g. (57.4%) of yellow crystalline 5-(2-aminophenyl)-7-chloro-1,3-dihydro - 1 - methyl-2H-1,4-benzodiazepin-2-one, M.P. 203–207°.

(F) A solution of 2.0 g. (6.7 mmol) of 5-(2-aminophenyl)-7-chloro-1,3-dihydro - 1 - methyl-2H-1,4-benzodiazepin-2-one, 50 ml. of pyridine and 10 ml. of acetic anhydride was stirred 18 hours at room temperature. The reaction mixture was concentrated to a waxy solid which was washed with water and air dried to give the theoretical amount of 5-(2-acetamidophenyl)-7-chloro-1,3-dihydro - 1 - methyl-2H-1,4-benzodiazepin-2-one, M.P. 245–250°. Recrystallizations from acetonitrile gave colorless prisms, M.P. 250–251°.

EXAMPLE 4

Preparation of 2-chloro-7,9,10,14b-tetrahydro-5-methyl-9-phenylquinazolino[3,4-d],[1,4]benzodiazepin-6(5H)-one

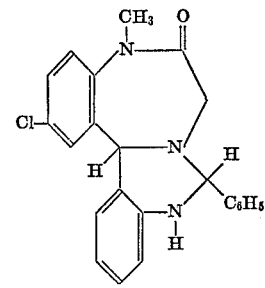

A solution of 1.5 g. (4.9 mmol) of 7-chloro-1-methyl-5-(2-aminophenyl) - 1,3,4,5 - tetrahydro-2H-1,4-benzodiazepin-2-one, 150 ml. of ethanol, 1 ml. of acetic acid and 3 ml. of benzaldehyde were stirred 20 hours at room temperature. Filtration of the reaction mixture afforded 1.5 g. (78.4%) of colorless crystalline product, M.P. 235–237°.

The starting material may be prepared as follows:

(A) A mixture of 2.5 g. (8.3 mmol) of 5-(2-aminophenyl) - 7 - chloro-1,3-dihydro-1-methyl-2H-1,4-benzodiazepin-2-one, about 100 mg. of platinum and 150 ml. of acetic acid was stirred under an atmosphere of hydrogen at room temperature. After the uptake of the theoretical amount of hydrogen, the catalyst was removed by filtration and the filtrate was diluted with ice water and extracted with methylene chloride. The extract was washed with water, 1.5 N sodium hydroxide and again with water, dried and concentrated to 2.2 g. (88%) of 7-chloro - 1 - methyl - 5 - (2-aminophenyl)-1,3,4,5-tetrahydro-2H-1,4-benzodiazepin-2-one. Recrystallizations from ethanol gave colorless prisms, M.P. 203–205°.

EXAMPLE 5

Preparation of 2-chloro-7,9,10,14b-tetrahydro-5,9,9-trimethylquinazolino[3,4-d][1,4]benzodiazepin-6(5H)-one

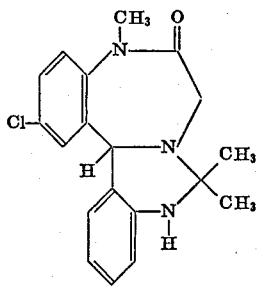

A solution of 7.6 g. (25.4 mmol) of 7-chloro-1-methyl-5 - (2 - aminophenyl) - 1,3,4,5-tetrahydro-2H-1,4-benzodiazepin-2-one was heated in acetone containing a catalytic amount of acetic acid and the addition of hexane resulted in the precipitation of 5.0 g. of a mixture of starting material and product. The mixture was recrystallized twice from methylene chloride-hexane and the precipitate treated with hot ethanol. The ethanol soluble material was recrystallized three times from ethyl acetate to give 0.6 g. (16.9%) of the above-titled product, M.P. 225–226°, as colorless prisms.

EXAMPLE 6

Preparation of 2-chloro-7,9,10,14b-tetrahydro-5-methylquinazolino[3,4-d][1,4]benzodiazepin-6(5H)-one

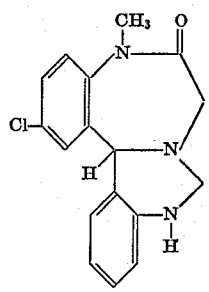

A solution of 200 mg. (0.66 mmol) of 7-chloro-1-methyl - 5 - (2-aminophenyl)-1,3,4,5-tetrahydro-2H-1,4-benzodiazepin-2-one, 1 drop of acetic acid and 5 drops of 37% aqueous formaldehyde in 20 ml. of ethanol was stirred one hour at room temperature. The reaction mixture was concentrated to a gum from which 100 mg. (48.1%) of colorless prisms of the above-titled compound, M.P. 218–225° was obtained by crystallization.

EXAMPLE 7

Preparation of 2-chloro-7,14b-dihydro-5-methylquinazolino-[3,4-d][1,4]benzodiazepine-6,9-(5H,10H)-dione

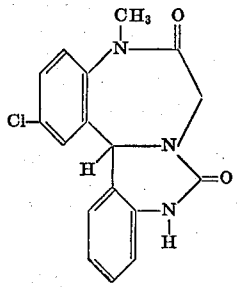

A solution of 1.5 g. (5 mmol) of 7-chloro-1-methyl-5-(2 - aminophenyl) - 1,3,4,5 - tetrahydro-2H-1,4-benzodiazepin-2-one and 300 mg. (7.5 mmol) of carbonyldiimidazole in 250 ml. of dry THF was stirred 48 hours at room temperature. The reaction mixture was concentrated to a yellow residue which was washed with water and recrystallized from ethanol to give 0.9 g. (55%) of the above-titled compound as colorless needles, M.P. 270–272°.

EXAMPLE 8

Preparation of 2-chloro-5,6,7,14b-tetrahydro-5-methylquinazolino[3,4-d][1,4]benzodiazepin-9(10H)-one

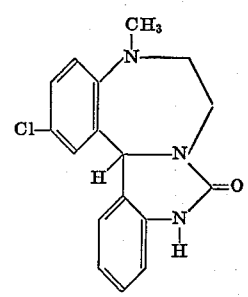

A solution of 290 mg. (1 mmol) of 5-(2-aminophenyl)-7 - chloro - 2,3,4,5 - tetrahydro - 1-methyl-1H-1,4-benzodiazepine, 250 mg. (1.5 mmol) of carbonyldiimidazole and 250 ml. of dry THF was stirred under dry nitrogen at room temperature for 17 hours. The reaction mixture was concentrated to a residue which was washed with water and recrystallized from chloroform-hexane to give 200 mg. (64%) of colorless prisms, M.P. 270–275° (dec.). Recrystallizations from methylene chloride-hexane gave the analytically pure product, M.P. 276–279° (dec.).

The starting material may be prepared as follows:

(A) To an ethereal solution (250 ml.) of 1.77 g. (6.2 mmol) of 5 - (2 - aminophenyl)-7-chloro-2,3-dihydro-1-methyl-1H-1,4-benzodiazepine, 3.0 g. of lithium aluminum hydride (LAH) was added, resulting in an immediate green color which passed through orange to yellow. The reaction mixture was stirred 17 hours at reflux. Hydrolysis of the reaction mixture was effected by the careful addition of 6 ml. of water and then 5 ml. of 10 N sodium hydroxide. The mixture was stirred at reflux for 2 hours, dried with anhydrous magnesium sulfate and filtered to give a colorless filtrate which was concentrated to a residue. Crystallization from ether-petrol gave the theoretical yield (1.8 g.) of the above-titled product, M.P. 145–147°. An analytical sample M.P. 147–148° was prepared by recrystallization from ether-petrol.

EXAMPLE 9

Preparation of 2-chloro-5,6,7,14b-tetrahydro-5-methylquinazolino[3,4-d][1,4]benzodiazepine

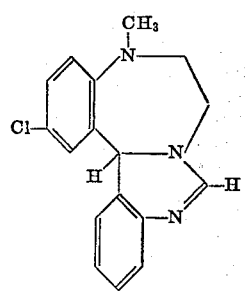

A solution of 288 mg. (1 mmol) of 5-(2-aminophenyl)-7 - chloro - 2,3,4,5 - tetrahydro - 1 - methyl-1H-1,4-benzodiazepine and 25 ml. of triethyl orthoformate was stirred at 100° for 12 hours. The reaction mixture was concentrated to a residue which was recrystallized from methylene chloride-hexane to give 200 mg. (67.2%) of the above-titled product as colorless needles, M.P. 179–180°.

EXAMPLE 10

Capsule formulation

| | Mg. per capsule |
|---|---|
| 2 - bromo - 7,14b - dihydro - 5 - methylquinazolino-[3,4 - d][1,4]benzodiazepine - 6,9 - (5H,10H) dione racemic | 10 |
| Lactose, U.S.P. | 165 |
| Corn starch, U.S.P. | 30 |
| Talc, U.S.P. | 5 |
| Total weight | 210 |

Procedure (1) 2 - bromo - 7,14b - dihydro-5-methylquinazolino-[3,4-d][1,4]benzodiazepine-6,9-(5H,10H)-dione racemic, lactose and corn starch were mixed in a suitable mixer.

(2) The mixture was further blended by passing through a Fitzpatric comminuting machine with a No. 1A screen with knives forward.

(3) The blended powder was returned to the mixer, the talc added and blended thoroughly.

(4) The mixture was filled into No. 4 hard shell gelatin capsules on a Parke-Davis capsulating machine. (Any similar type capsulating machine may be used.)

EXAMPLE 11

Tablet formulation

| | Mg. per tablet |
|---|---|
| 2 - bromo - 7,14b - dihydro-5-methylquinazolino-[3,4 - d][1,4]benzodiazepine - 6,9 - (5H,10H)-dione racemic | 25.00 |
| Dicalcium phosphate dihydrate, unmilled | 175.00 |
| Corn starch | 24.00 |
| Magnesium stearate | 1.00 |
| Total weight | 225.00 |

Procedure (1) 2 - bromo - 7,14b - dihydro-5-methylquinazolino-[3,4-d][1,4]benzodiazepine-6,9-(5H,10H)-dione racemic and corn starch were mixed together and passed through a No. 00 screen in Model "J" Fitzmill with hammers forward.

(2) This premix was then mixed with dicalcium phosphate and one-half of the magnesium stearate, passed through a No. 1A screen in Model "J" Fitzmill with knives forward, and slugged.

(3) The slugs were passed through a No. 2A plate in a Model "D" Fitzmill at slow speed with knives forward, and the remaining magnesium stearate was added.

(4) The mixture was mixed and compressed.

EXAMPLE 12

Suppository formulation

| | Gm. per 1.3 gm. suppository |
|---|---|
| 2 - bromo - 7,14b - dihydro-5-methylquinazolino-[3,4 - d][1,4]benzodiazepine 6,9 - (5H,10H)-dione racemic | 0.010 |
| Wecobee M | 1.245 |
| Carnauba wax | 0.045 |

Procedure (1) The Wecobee M and the carnauba wax were melted in a suitable size glass-lined container (stainless steel may also be used), mixed well and cooled to 45° C.

(2) The 2 - bromo-7,14b-dihydro-5-methylquinazolino-[3,4-d][1,4]benzodiazepine-6,9-(5H,10H)-dione racemic which had been reduced to a fine powder with no lumps, was added and stirred until completely and uniformly dispersed.

(3) The mixture was poured into suppository molds to yield suppositories having an individual weight of 1.3 grams.

(4) The suppositories were cooled and removed from molds. They were then individually wrapped in wax paper for packaging (foil may also be used).

EXAMPLE 13

In similar fashion as disclosed in Examples 10, 11 and 12, the following compounds may be formulated into capsules, tablets and suppositories using the same proportion of materials:

2-bromo-7,9,10,14b-tetrahydro-5,9,9-trimethyl-quinazolino[3,4-d][1,4]benzodiazepin-6(5H)-one (racemic)
2-chloro-7,9,10,14b-tetrahydro-5-methyl-9-phenylquinazolino[3,4-d][1,4]benzodiazepin-6(5H)-one (racemic)
2-chloro-7,9,10,14b-tetrahydro-5,9,9-trimethylquinazolino[3,4-d][1,4]benzodiazepin-6(5H)-one (racemic)
2-chloro-7,9,10,14b-tetrahydro-5-methyl-quinazolino[3,4-d][1,4]benzodiazepin-6(5H)-one (racemic)
2-chloro-7,14b-dihydro-5-methyl-quinazolino[3,4-d][1,4]benzodiazepine-6,9(5H,10H)-dione (racemic)
2-chloro-7,14b-dihydro-5,9-dimethylquinazolino[3,4-d][1,4]benzodiazepin-6(5H)-one (racemic)
2-chloro-7,14b-dihydro-5,9-dimethylquinazolino[3,4-d][1,4]benzodiazepin-6(5H)-one hydrochloride hemihydrate (racemic)

EXAMPLE 14

A representative group of compounds of the present invention were tested to determine their pharmacological activity. The tests employed for this purpose are as follows:

Inclined screen

The purpose of this test is to determine muscle relaxant activity utilizing mice as subjects. Groups of six male mice are given the test drug (maximum dose of 500 mg./kg.) and then are left in the inclined screen at least four hours for observation of paralyzing effects severe enough to cause them to slide off the screen. This activity is observed, additional doses are tested until at least two are reached at which some, but not all the animals slide off the screen. Doses at which mice fall off the screen due to toxicity or excitation are not included in the calculation of $PD_{50}$. The $PD_{50}$ is determined by the methods of Behrens from a graph on which dose is plotted against percent of mice paralyzed. Thus, the $PD_{50}$ (mg./kg.) is a dose which can be expected to cause 50 percent of mice to slide off the screen.

| Compound: | $PD_{50}$ (mg./kg.) |
|---|---|
| 2 - bromo - 7,9,10,14b - tetrahydro - 5,9,9-trimethyl quinazolino[3,4 - d][1,4]benzodiazepin-6(5H)-one | 125 |
| 2 - bromo - 7,14b-dihydro-5-methylquinazolino[3,4-d][1,4]benzodiazepine - 6,9-(5H,10H)-dione | 400 |
| 2 - chloro - 7,9,10,14b - tetrahydro-5,9,9-trimethylquinazolino[3,4 - d][1,4]benzodiazepin-6(5H)-one | 100 |

Foot shock

In this test a pair of mice is confined under a 1 liter beaker placed on a grid which presents shock to the feet. At least five fighting episodes are elicited in a two-minute period. Pairs of mice are marked and pre-treated one hour prior to a second shocking. Logarithmic dose intervals are utilized up to a maximum of 100 mg./kg. At the 100 percent blocking dose, three out of three pairs must be blocked from fighting. The results are expressed as dose in mg./kg. which blocks the fighting response for 1 hour.

| Compound: | Dose (mg./kg.) |
|---|---|
| 2 - chloro - 7,9,10,14b - tetrahydro-5,9,9-trimethylquinazolino[3,4 - d][1,4]benzodiazepin - 6-(5H) - one | 100 |

We claim:
1. Compounds of the formula

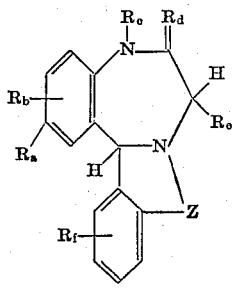

wherein Z is selected from the group consisting of

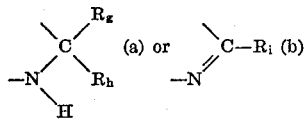

$R_a$ and $R_b$ each independently are selected from the group consisting of hydrogen, halogen, nitro, trifluoromethyl, lower alkyl, lower alkyl-mercapto, or lower alkoxy; $R_c$ is hydrogen, lower alkyl cycloalkyl containing from 3 to 6 carbon atoms, amino lower alkyl, monoalkylamino-loweralkyl, dialkylamino lower alkyl, carboxy lower alkyl or hydroxy lower alkyl; $R_d$ is selected from the group consisting of

=S or =O; $R_e$ is hydrogen, lower alkyl, hydroxy, lower alkoxy, lower alkoxy-lower alkyl and lower alkyl mercapto-lower alkyl; $R_f$ is hydrogen, lower alkyl, halogen, nitro or trifluoromethyl; $R_g$, $R_h$ and $R_i$ each independently are hydrogen, lower alkyl, phenyl or phenyl substituted by a member selected from the group consisting of halogen, nitro, lower alkyl, trifluoromethyl, lower alkoxy, lower alkyl-mercapto or lower alkylamino and $R_g$ and $R_h$ taken together with the co-bonded carbon atom is a cyclo alkyl group having 3 to 6 carbon atoms or a carbonyl group and the pharmaceutically acceptable acid addition salts thereof.

2. The compounds of claim 1 wherein $R_d$ is =O and Z is group (a) that is, compounds of the formula

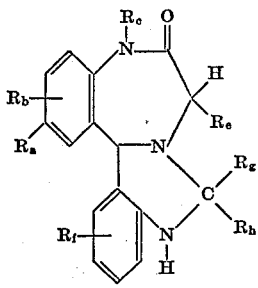

wherein $R_a$, $R_b$, $R_c$, $R_e$, $R_f$, $R_g$ and $R_h$ are as in claim 1.

3. The compounds of claim 2 wherein $R_a$ is halogen; $R_b$, $R_e$ and $R_f$ are hydrogen; $R_c$ is lower alkyl and $R_g$ and $R_h$ taken together with the co-bonded carbon atom is a carbonyl group.

4. The compound of claim 3 which is 2-bromo-7,14b-dihydro - 5 - methylquinazolino[3,4 - d][1,4]benzodiazepine-6,9(5H,10H)-dione.

5. The compound of claim 3 which is 2 - chloro-7,14b-dihydro - 5 - methylquinazoline[3,4 - d][1,4]benzodiazepine-6,9(5H,10H)-dione.

6. The compounds of claim 2 wherein $R_a$ is halogen; $R_b$, $R_e$, $R_f$, $R_g$ and $R_h$ are hydrogen, and $R_c$ is lower alkyl.

7. The compound of claim 6 which is 2 - chloro-7,9,10,14b - tetrahydro - 5 - methylquinazolino[3,4-d][1,4]benzodiazepin-6(5H)-one.

8. The compounds of claim 2 wherein $R_a$ is halogen; $R_b$ and $R_e$ are hydrogen; $R_c$ is lower alkyl and $R_g$ and $R_h$ each are lower alkyl.

9. The compound of claim 8 which is 2-bromo-7,9 10,14b - tetrahydro - 5,9,9 - trimethylquinazolino[3,4-d] [1,4]benzodiazepin-6(5H)-one.

10. The compound of claim 8 which is 2-chloro-7,9, 10,14b - tetrahydro - 5,9,9 - trimethylquinazolino[3,4-d] [1,4]benzodiazepin-6(5H)-one.

11. The compounds of claim 2 wherein $R_a$ is halogen; $R_b$ and $R_e$ are hydrogen; $R_c$ is lower alkyl and $R_g$ and $R_h$ taken independently are hydrogen or phenyl.

12. The compound of claim 11 which is 2 - chloro-7,9,10,14b - tetrahydro - 5 - methyl - 9 - phenylquinazolino[3,4-d][1,4]benzodiazepin-6(5H)-one.

13. The compounds of claim 1 wherein $R_d$ is =O and Z is group (b), that is, compounds of the formula

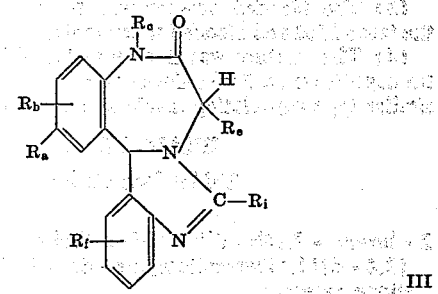

where $R_a$, $R_b$, $R_c$, $R_e$, $R_f$ and $R_i$ are as in claim 1.

14. The compounds of claim 13 wherein $R_a$ is halogen; $R_b$, $R_e$ and $R_f$ are hydrogen and $R_c$ and $R_i$ are lower alkyl.

15. The compound of claim 14 which is 2-chloro-7,14b - dihydro - 5,9 - dimethylquinazolino[3,4-d][1,4] benzodiazepin-6(5H)-one.

16. The compounds of claim 1 wherein $R_d$ is

and Z is group (a) that is compounds of the formula

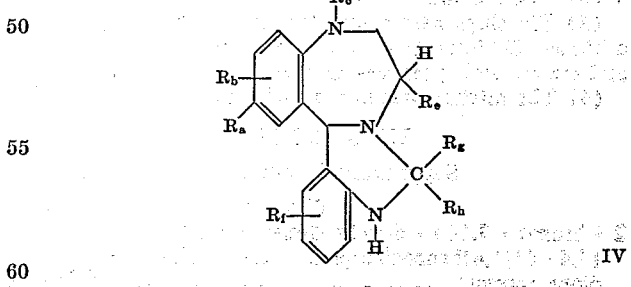

where $R_a$, $R_b$, $R_c$, $R_f$, $R_g$ and $R_h$ are as in claim 1.

17. The compounds of claim 16 wherein $R_a$ is halogen; $R_b$, $R_e$ and $R_f$ are hydrogen and $R_g$ and $R_h$ taken together with the co-bonded carbon atom is a carbonyl group.

18. The compound of claim 17 which is 2-chloro-5,6,7,14b - tetrahydro - 5-methylquanazolino[3,4-d][1,4]-benzodiazepin-9-(10H)-one.

19. The compounds of claim 1 wherein $R_d$ is

and Z is group (b) that is, compounds of the formula

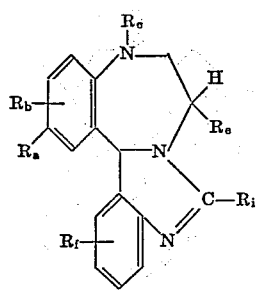

where $R_a$, $R_b$, $R_c$, $R_e$, $R_f$ and $R_i$ are as in claim 1.

20. The compounds of claim 19 wherein $R_a$ is halogen; $R_b$, $R_e$, $R_f$ and $R_i$ are hydrogen and $R_c$ is lower alkyl.

21. The compounds of claim 20 that is, 2-chloro-5,6,7,14b - tetrahydro - 5-methylquinazoline[3,4-d][1,4]-benzodiazepine.

22. A process for the preparation of compounds of the formula

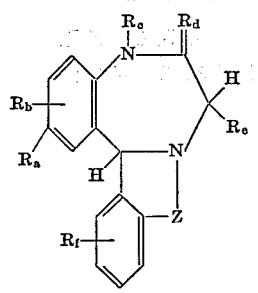

where Z is

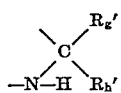

and $R_a$ and $R_b$ each independently are selected from the group consisting of hydrogen, halogen, nitro, trifluoromethyl, lower alkyl, lower alkylmercapto, or lower alkoxy; $R_c$ is hydrogen, lower alkyl cycloalkyl containing from 3 to 6 carbon atoms, amino lower alkyl, monoalkylamino-lower alkyl, dialkylamino-lower alkyl, carboxy-lower alkyl or hydroxy lower alkyl; $R_d$ is selected from the group consisting of

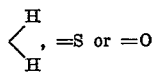

$R_e$ is hydrogen, lower alkyl, hydroxy, lower alkoxy, lower alkoxy-lower alkyl and lower alkyl mercapto-lower alkyl; $R_f$ is hydrogen, lower alkyl, halogen, nitro or trifluoromethyl; $R_g'$ and $R_h'$ each independently are hydrogen, lower alkyl, phenyl or phenyl substituted by a member selected from the group consisting of halogen, nitro, lower alkyl, trifluoromethyl, lower alkoxy, lower alkyl-mercapto or lower alkylamino and $R_g'$ and $R_h'$ taken together with the co-bonded carbon atom is a cycloalkyl group having 3 to 6 carbon atoms which process comprises reacting a compound of the formula

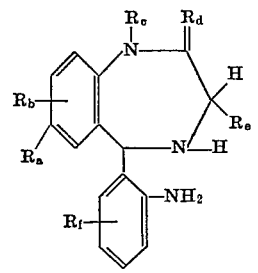

where $R_a$, $R_b$, $R_c$, $R_d$, $R_e$ and $R_f$ are as above with a compound of the formula

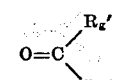

where $R_g'$ and $R_h'$ are as above.

23. A process for the preparation of compounds of the formula

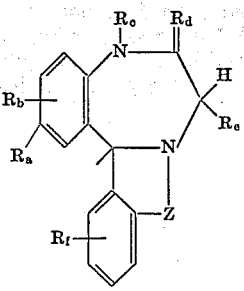

where Z is

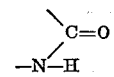

where $R_a$ and $R_b$ each independently are selected from the group consisting of hydrogen, halogen, nitro, trifluoromethyl, lower alkyl, lower alkylmercapto, or lower alkoxy; $R_c$ is hydrogen, lower alkyl cycloalkyl containing from 3 to 6 carbon atoms, amino lower alkyl, monoalkylamino-lower alkyl, dialkylamino-lower alkyl, carboxyl-lower alkyl or hydroxy lower alkyl; $R_d$ is selected from the group consisting of

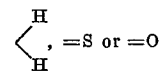

$R_e$ is hydrogen, lower alkyl, hydroxy, lower alkoxy, lower alkoxy-lower alkyl and lower alkyl mercapto-lower alkyl; $R_f$ is hydrogen, lower alkyl, halogen, nitro or trifluoromethyl which process comprises reacting a compound of the formula

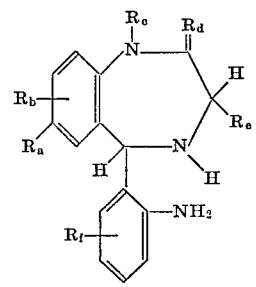

where $R_a$, $R_b$, $R_c$, $R_d$, $R_e$ and $R_f$ are as above with a carbonylating agent selected from the group consisting of carbonyldiimidazole and phosgene.

24. The process of claim 23 where said carbonylating agent is carbonyldiimidazole.

25. A process for the preparation of compounds of the formula

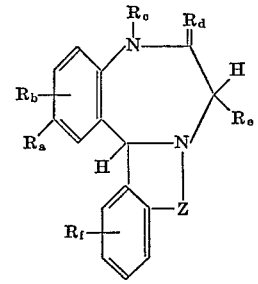

where Z is

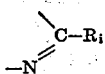

where $R_a$ and $R_b$ each independently are selected from the group consisting of hydrogen, halogen, nitro, trifluoromethyl, lower alkyl, lower alkylmercapto, or lower alkoxy; $R_c$ is hydrogen, lower alkyl cycloalkyl containing from 3 to 6 carbon atoms, amino lower alkyl, monoalkylamino-lower alkyl, dialkylamino-lower alkyl, carboxyl-lower alkyl or hydroxy lower alkyl; $R_d$ is selected from the group consisting of

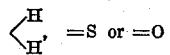

$R_e$ is hydrogen, lower alkyl, hydroxy, lower alkoxy, lower alkoxy-lower alkyl and lower alkyl mercapto-lower alkyl; $R_f$ is hydrogen, lower alkyl, halogen, nitro or trifluoromethyl and $R_i$ is hydrogen, lower alkyl, phenyl or phenyl substituted by a member selected from the group consisting of halogen, nitro, lower alkyl, trifluoromethyl, lower alkoxy, lower alkyl-mercapto or lower alkylamino which process comprises dehydrative cyclization of a compound of the formula

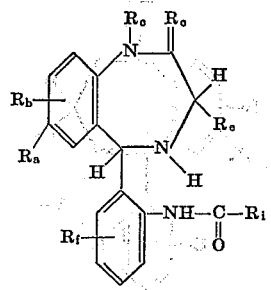

where $R_a$, $R_b$, $R_c$, $R_d$, $R_e$, $R_f$ and $R_i$ are as above.

References Cited
UNITED STATES PATENTS
3,420,818   1/1969   Ott _____ 260—239.3

HENRY R. JILES, Primary Examiner
R. T. BOND, Assistant Examiner

U.S. Cl. X.R.
260—256.4 F, 256.5 R; 424—244;

UNITED STATES PATENT OFFICE
CERTIFICATE OF CORRECTION

PO-1050
(5/69)

Patent No. 3,651,046    Dated March 21, 1972

Inventor(s) Derieg, Fryer and Sternbach

It is certified that error appears in the above-identified patent and that said Letters Patent are hereby corrected as shown below:

| Column | line | Claim |
|---|---|---|
| 19, | 47, | 2 |
| 19, | 63 | 3 |
| 19, | 73 | 6 |
| 20, | 4 | 8 |
| 20, | 13 | 11 |
| 20, | 19 | 13 |
| 20, | 36 | 14 |
| 20, | 42 | 16 |
| 20, | 62 | 17 |
| 20, | 70 | 19 |
| 21, | 14 | 20 |
| 21, | 17 | 21 |
| 21, | 20 | 22 |
| 22, | 7 | 23 |
| 22, | 62 | 25 |

"The compounds"   should be

A compound

UNITED STATES PATENT OFFICE
CERTIFICATE OF CORRECTION

Patent No. 3,651,046    Dated

Inventor(s)

It is certified that error appears in the above-identified patent and that said Letters Patent are hereby corrected as shown below:

Column 19, line 28 claim 1
" 21, " 43 " 22
" 22 " 31 " 23
" 23 " 10 " 25

"monoalkylamino-loweralkyl,dialkylamino lower alkyl"

should be deleted

Column 19, line 35 in claim 1 delete "and" and add or

Column 20, line 14 of claim 11

"$R_e$ is lower" should be $R_c$ is lower

Column 21, line 18 of claim 21

"methylquinazoline" should be methylquinazolino

UNITED STATES PATENT OFFICE
CERTIFICATE OF CORRECTION

Patent No. 3,651,046  Dated _____

Inventor(s) _____

It is certified that error appears in the above-identified patent and that said Letters Patent are hereby corrected as shown below:

Column 23, line 15  claim 25

$$\overset{"}{H} \quad \overset{"}{H'} \qquad \text{should be} \qquad \overset{"}{H} \\ H,$$

Column 24, line 1 of claim 25

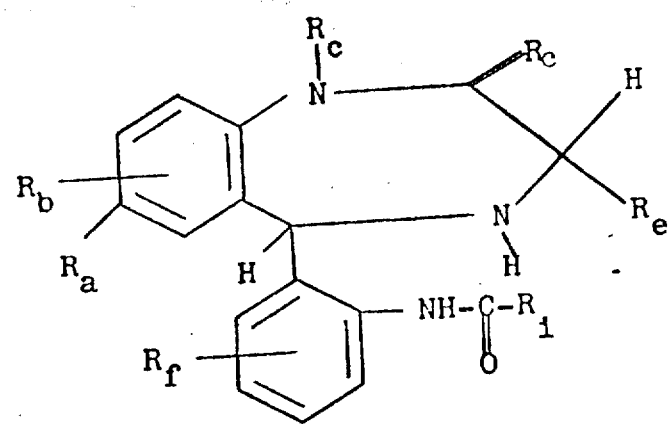

where $R_a$, $R_b$, $R_c$, $R_d$, $R_e$, $R_f$ and $R_i$ are as above.

should be

UNITED STATES PATENT OFFICE
CERTIFICATE OF CORRECTION

Patent No. 3,651,046           Dated _____

Inventor(s) _____

It is certified that error appears in the above-identified patent and that said Letters Patent are hereby corrected as shown below:

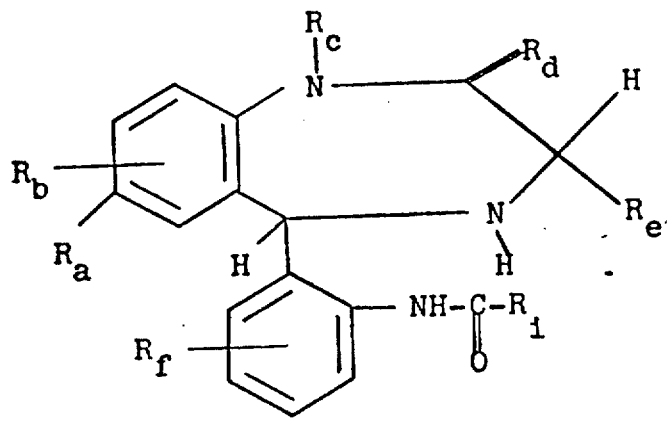

where $R_a$, $R_b$, $R_c$, $R_d$, $R_e$, $R_f$ and $R_i$ are as above.

Signed and sealed this 25th day of July 1972.

(SEAL)
Attest:

EDWARD M. FLETCHER, JR.                ROBERT GOTTSCHALK
Attesting Officer                       Commissioner of Patents